June 2, 1942.  E. W. MARCHAND, JR., ET AL  2,285,343
VALVE
Filed Sept. 28, 1940

Inventors:
Eugene W. Marchand Jr,
Edward A. Fredrickson &
Roy H. Zinkil.
By Joseph O. Lange, Atty.

Patented June 2, 1942

2,285,343

UNITED STATES PATENT OFFICE 2,285,343

VALVE

Eugene W. Marchand, Jr., Maywood, Edward A. Fredrickson, Chicago, and Roy H. Zinkil, Oak Park, Ill., assignors to Crane Co., Chicago, Ill. a corporation of Illinois Application September 28, 1940, Serial No. 358,796

5 Claims. (Cl. 251—48)

Our invention relates to valves and while it is applicable to ordinary valve structures our improvements embody particular advantages in stops and/or quiet flow throttling valves in which a positive closure member is combined with a resilient throttling member to provide relatively simple and economical valves for the purpose. This application is in furtherance of and constitutes an improvement upon our copending patent application Serial No. 322,654, filed March 7, 1940.

An important object of our invention is to provide a valve for use preferably, though not necessarily, on a domestic water supply pipeline which valve will serve the dual purpose of shutting off the flow of fluid through the pipeline or of maintaining substantially quiet flow therethrough at relatively high velocities.

Another object lies in the provision of a valve closure member having an improved guiding and fluid passageway forming portion whereby the chattering of the valve and the usual noises produced by fluid passing through the valve are materially reduced or else substantially eliminated.

It is also an object of our invention to provide in combination therewith an improved cooperating guiding member for the valve closure member and with novel means for securing the said guiding member within the valve.

A still further object of our invention lies in the provision of a resilient conical shaped seating member for the closure member having one or more chambers into which the resilient member may distort upon external pressure being applied thereto, as in seating the closure member, whereby the portions of the resilient seating member extending beyond the limits of the valve seat will not have a tendency to bulge over the end peripheries of the seat and thus become subject to cutting and abrasive treatment upon operation of the valve.

With the above and other objects and advantages in view, the invention comprises certain features of construction and operation of parts which will hereinafter be described in detail in connection with the drawing, wherein Fig. 1 is a vertical sectional view of a valve embodying our invention.

Like reference numerals refer to like parts throughout the various views of the drawing.

We have chosen to illustrate and describe our invention as it may be applied to a non-rising stem type of valve having a frusto-conical seat and closure member, but it will be apparent as the description proceeds that the invention is equally applicable to a rising stem type of valve.

Figure 1:
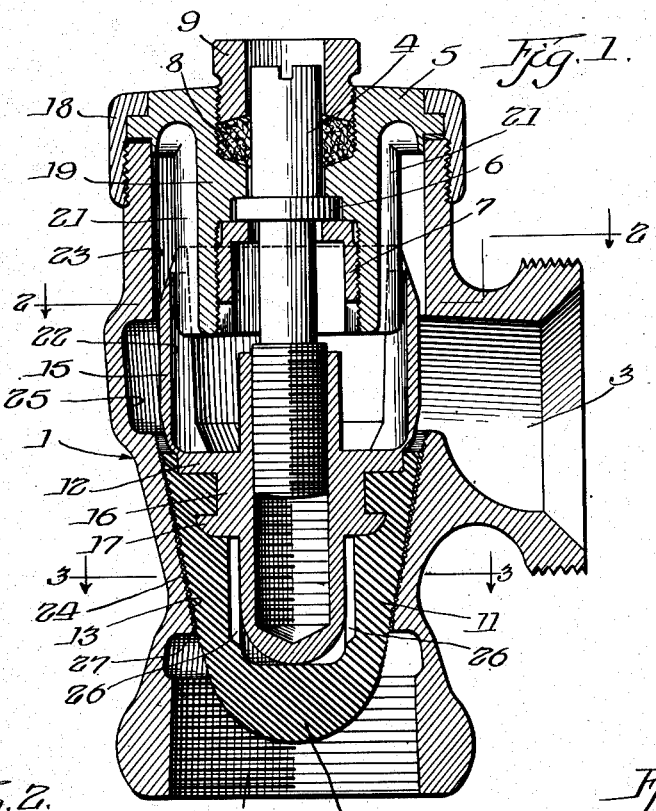

Referring to Fig. 1, the valve body or casing, generally designated 1, is provided with the usual threaded inlet 2 and the threaded outlet 3 and also has its upper portion adapted to receive the valve operating members. As previously stated, the valve is of the type generally known as a non-rising stem valve wherein the operating spindle 4 extends through the centerpiece member 5 and is maintained in rotatable but non-reciprocable relationship therewith by the laterally projecting annular rib 6, the latter being restrained against reciprocal movement by the nut 7. The upper portion of the spindle 4 is surrounded by a stuffing box wherein a quantity of packing 8 is compressed by the stuffing nut 9 so as to prevent fluid leakage past the spindle.

The valve closure member comprises the conical shaped resilient seating member 11 which is assembled upon the lower portion of the holder member 12. The seating member 11 is preferably made of a molded resilient material such as, for example, rubber or the like, having its external conical surface serrated or roughened as at 13 and the lower end thereof closed and hemispherical in shape as at 14. The central and upper portions of the seating member 11 are hollow and the member is adapted to be assembled onto the lower portion of the holder member 12 simply by pushing the latter member into the hollow portions of the rubber member.

The holder 12 comprises a cup-shaped upper portion 15 and an internally screw threaded spindle receiving lower portion 16. The external shape of the lower portion 16 is generally cylindrical and is provided with a suitable flange 17 which acts to retain the seating member 11 thereon.

Figure 2:
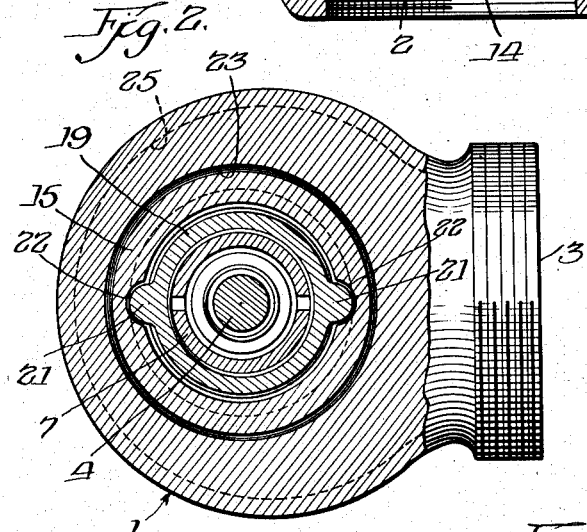
Fig. 2 is a view taken on the line 2—2 of Fig. 1.

The centerpiece member 5 which we prefer to attach to the upper portion of the casing 1 by means of a union ring nut 18, has a depending portion 19 provided with a pair of axial ribs 21 all of which fit telescopically within the cup-shaped upper portion 15 of the holder 12. As more clearly shown in Fig. 2, the cup 15 is provided with the grooves 22 into which the ribs 21 extend whereby the depending portion 19 of the centerpiece member 5 in cooperation with the hollow cylindrical upper portion 23 of the valve body 1 guide the said holder and restrict it to reciprocal movement upon manual operation of the spindle 4.

It will be noted that the conical valve seat is preferably, although not necessarily, provided with a serrated or roughened surface as at 24. When the closure member is in a throttled position, the velocity of the fluid between the surfaces 13 and 24 frequently becomes relatively high causing cavitation of the fluid and thus producing noises. In order to maintain the velocity of the fluid below a critical noise producing value when the valve is throttled, it has been found that roughened or serrated surfaces upon either or both of the seat and closure member efficiently cause sufficient turbulence in the fluid flow therebetween to reduce the velocity below that critical value. In addition, however, we prefer to provide at least one resilient cooperating seating surface in the valve for the purpose of silencing even further the inherent noises in the pipeline.

In order to further enhance the quiet flow of fluid through the valve, it will also be noted that the external surface of the cup 15 together with the channeled portion 25 of the valve body cooperate to form an unbroken walled fluid passageway from all points at the outlet of the seating surfaces to the outlet of the valve.

Figure 3:
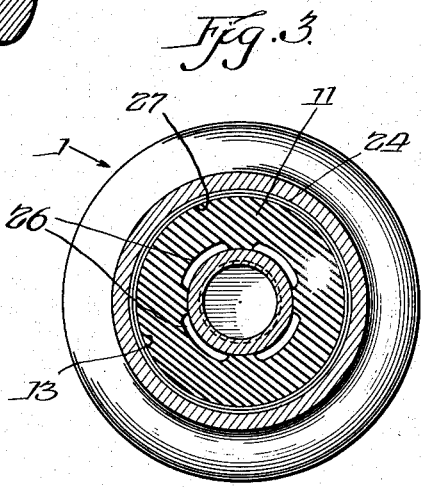
Fig. 3 is a view taken on the line 3—3 of Fig. 1.

Attention is now directed to Fig. 3, wherein a sectional view is shown through the central portion of the rubber seating member 11. We provide preferably a plurality of axial flutes or chambers 26 into which the rubber positioned externally thereof may distort upon the seating of the closure member. It will be apparent that without the provision of the chambers 26, upon seating of the closure member for a complete stoppage of fluid flow through the valve there would be a tendency for the rubber to bulge outwardly and under the lower edge 27 (Fig. 1) of the valve seat. By providing space within the rubber member 11 for the rubber to compress thereinto the service life of the rubber is materially prolonged and there will be no tendency for the rubber to be cut and abraded by the relatively sharp edge at 27.

Having thus described in detail the preferred embodiment of our invention, it is of course evident that the parts may be varied in many particulars without departing from the spirit and scope of the invention as defined by the appended claims.

We claim:

1. A valve comprising a casing having an inlet and an outlet, a circular seat of varying cross-section within the said casing, a closure member for said seat, said closure member comprising a hollow circular resilient seating member of varying cross-section and a partially enclosed holder member therefor, the means providing for said partial enclosure of the said holder member comprising a cylindrical walled portion extending within an upper recessed portion of the said casing, said seating member having chambers interiorly thereof whereby upon closing the said valve the resilient material displaced by the seat may distort into the said chambers, the said circular seat having a roughened seating surface thereon.

2. A valve comprising a casing having an inlet and an outlet, a substantially conical seat within the said casing, a closure member for said seat, said closure member comprising a substantially conical rubber-like seating member having a rounded lower nose portion within the path of flow, a walled holder member for the said rubber-like seating member and of a diameter substantially equal to that of the upper end of the conical seat, said seating member having chambers interiorly thereof whereby upon closing the said valve the resilient material displaced by the seat may deform into the said chambers, the said conical seat member and the said conical rubber-like seating member having a roughened seating surface therebetween.

3. A valve comprising a casing having an inlet and an outlet, a substantially conical seat within the said casing, a closure member for said seat, said casing having within it substantially unbroken walled passageways of gradually increasing cross-section from all points at the outlet of the seating surfaces to the outlet of the valve, said closure member comprising a hollow substantially conical rubber-like seating member having a rounded lower portion, a holder member therefor having an exteriorly extending flanged portion, a cylindrical walled extension cooperating with the said holder member to form a substantial portion of an unbroken annular passageway within the said casing above the said seat, the said seating member having chambers interiorly thereof whereby upon closing the said valve the rubber-like material displaced by the seat may deform into the said chambers, the said hollow rubber-like member having an annular recess extending around the inside thereof and designed to fit snugly over the flanged portion of the aforesaid holder member whereby the rubber-like seating member can be removably assembled onto said holder member by forcing the latter into the former, the said conical seat member and the said hollow conical resilient seating member having a roughened seating surface therebetween.

4. A valve comprising a casing having an inlet and an outlet, a circular seat of varying cross-section within the said casing, a closure member for said seat, guiding means within the casing for restricting the closure member to substantially non-rotative reciprocal movement, said closure member comprising a hollow circular resilient seating member of varying cross-section, a holder member extending into the said resilient seating member, said seating member and the said holder member having chambers therebetween, whereby upon closing the said valve the resilient material displaced by the seat may distort into the said chambers, the said holder member and the said resilient seating member having means whereby the said hollow resilient member is removably secured upon the said holder member, the said circular seat member and the said hollow resilient seating member having a serrated seating surface therebetween.

5. In a valve, a casing having an inlet and an outlet, a tapered valve seat within the said casing, a closure member for the said seat, the said closure member comprising a tapered resilient seating member and a holder therefor, the said holder having a cylindrical portion extending upwardly axially from the said seating member, the cylindrical portion being of a diameter substantially equal to the large diameter of the tapered portion of the said seating member and extending at all positions of the seating member relatively closely within an upper recess of the said casing, a centerpiece member secured within the said casing and telescopically depending within the said cylindrical portion, cooperating means on the said centerpiece member and the said cylindrical portion whereby relative movement between the said centerpiece member and the said cylindrical portion is closely guided and restricted to substantially non-rotative reciprocal movement.

EUGENE W. MARCHAND, Jr.
EDWARD A. FREDRICKSON.
ROY H. ZINKIL.